UNITED STATES PATENT OFFICE.

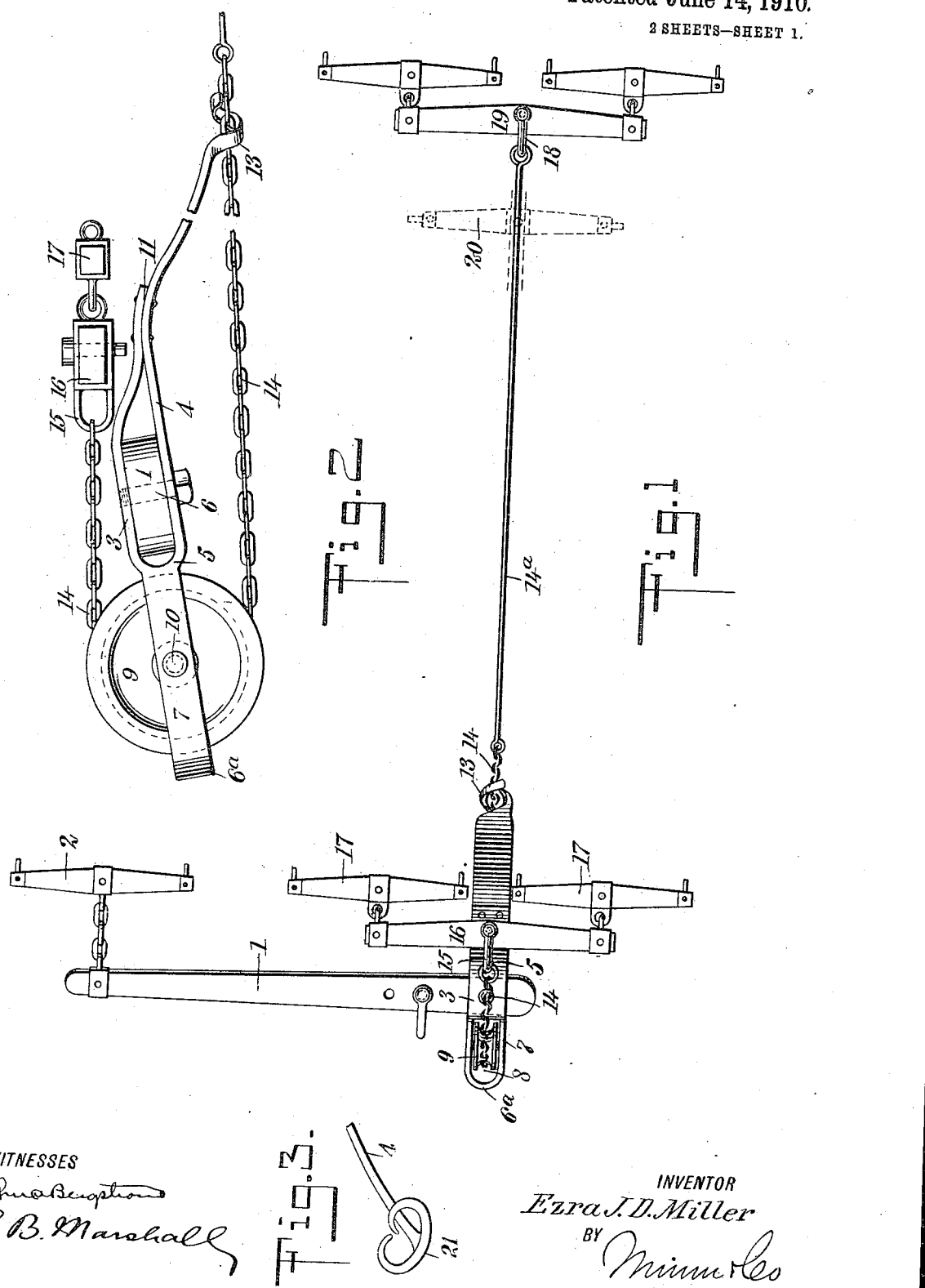

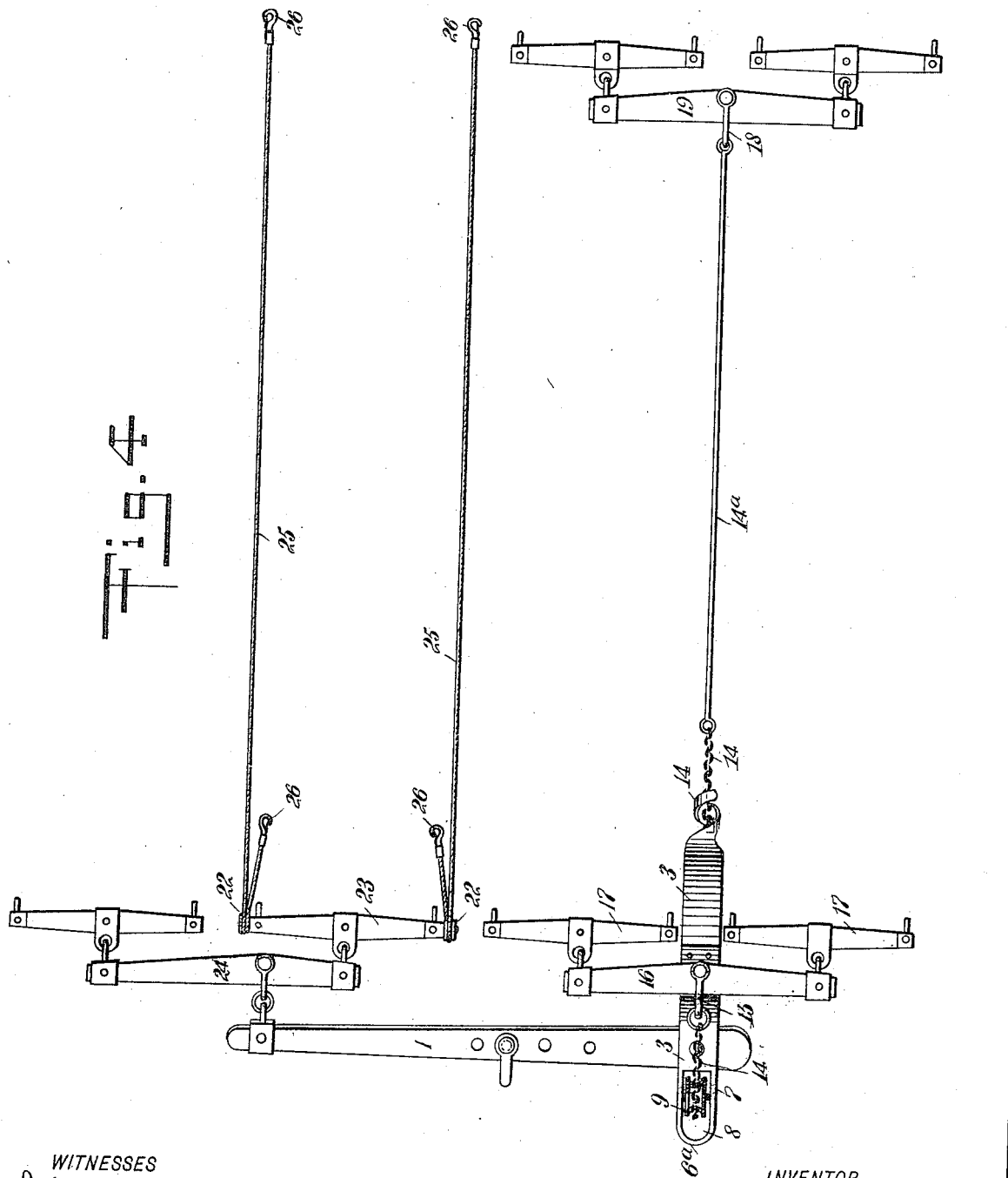

EZRA J. D. MILLER, OF BARLOW, NORTH DAKOTA.

DRAFT-EQUALIZER.

961,513.  Specification of Letters Patent.  Patented June 14, 1910.

Application filed October 26, 1909. Serial No. 524,645.

*To all whom it may concern:*

Be it known that I, EZRA J. D. MILLER, a citizen of the United States, and a resident of Barlow, in the county of Foster and State of North Dakota, have invented a new and Improved Draft-Equalizer, of which the following is a full, clear, and exact description.

My invention relates to draft equalizers, and it has for its object to provide means which will equalize the draft between horses hitched tandem, the rear double-tree being free to move laterally and longitudinally relatively to a frame in which a sheave is mounted to rotate, the forward end of the frame being bent downward and having an open spiral through which a chain connected to the forward double-tree passes, the chain being disposed over the sheave, and the other terminal being secured to the rear double-tree.

Still other objects of the invention will appear in the following complete description.

In this specification I will describe the preferred form of my invention, it being understood that the scope of the invention is defined in the appended claims.

Reference is to be had to the accompanying drawings forming a part of this specification, in which similar characters of reference indicate corresponding parts in all the views.

Figure 1 is a plan view showing the arrangement of my equalizer with reference to the equalizer bar and the whiffle-trees; Fig. 2 is an enlarged side elevation of my draft equalizers; Fig. 3 is a fragmentary view showing a modified form of the means at the free terminal of the arm for engaging the chain; and Fig. 4 is a view similar to that shown in Fig. 1, but with means for attaching seven horses.

By referring to the drawings it will be seen that an equalizer bar 1 is provided, which is adapted to be secured to the load, which is to be hauled. The long end of this equalizer bar has secured to it a swingle-tree 2, and the other end of the equalizer bar passes between arms 3 and 4 of a frame 5. The equalizer bar 1 is secured to the frame 5 by means of a screw 6, which passes from below through orifices in the arm 4 and in the equalizer bar 1 and screws in a threaded orifice in the arm 3, the orifices being in alinement. The rear of the frame 5 is in the form of a loop 6ª between the sides 7 of which there is a slot 8 in which is disposed a sheave 9, a pin 10 passing through the center of the sheave, this pin 10 being journaled in the sides 7 of the loop 6ª of the frame. The forward end of the arm 3 of the frame 5 is disposed downward until it meets the arm 4 of the frame, and it is secured thereto at 11 by means of rivets. The forward end of the arm 4 of the frame 5 is disposed downward from the portion 11. On the free terminal of the arm 4 there is secured an open spiral 13 or, if desired, two oppositely disposed half rings 21 may be substituted for the open spiral. A chain 14 is disposed in this open spiral 13, the chain 14 passing around the sheave 9 and over the frame 5, where it is secured to a clevis 15 of a double-tree 16. Swingle-trees 17 are secured to the double-tree 16, in the customary manner. To the forward end of the chain 14 is secured a flexible rod 14ª, secured to a clevis 18, which is secured to the forward double-tree 19. A neck yoke or spreader 20 has a ring or pulley through which is disposed the rod 14ª.

As shown in Fig. 4 of the drawings, pulleys 22 may be secured to a swingle-tree 23 secured to a double-tree 24 substituted for the swingle-tree 2 shown in Fig. 1 of the drawings. Ropes or chains 25 are mounted on the pulleys 22, there being snap hooks 26 which are secured to the terminals of the said ropes 25. By this arrangement two horses may be hitched tandem, one horse being disposed just in front of the swingle-tree 23 with one set of the snap hooks 26 connected with the rings on the traces of the harness on the horse, and the other horse being disposed just in front of the first horse with the other set of snap hooks connected with the rings on the traces of the harness on the horse.

When using my invention, the draft between the leading animals and those nearest the vehicle is equalized, while at the same time the rear double-tree is free to move laterally relatively to the frame 5, so that the draft animals have the greatest freedom of action and at the same time they are so secured to the implement that they are able to exert their power with the best results. When desired, the frame 5 may be hitched to the implement by means of a clevis having its pin disposed through the loop 6ª of the frame. The chain 14 may be readily disengaged intermediate its terminals from the free terminal of the arm 4, this being permitted by the construction of the open spiral 13. When seven horses are used a double tree 24 with a swingle-tree with pulleys is substituted for the swingle-tree 2, and two horses are hitched tandem to the terminals of the ropes disposed over the pulleys.

Having thus described my invention, I claim as new and desire to secure by Letters Patent:

1. In a draft equalizer, an equalizer bar, means to connect the equalizer bar with a load to be drawn, a frame having two horizontal arms, between which the equalizer bar is secured, the forward terminal of the said arms converging, the free terminal of one of the arms having an eye with a lateral opening, a sheave pivoted to the frame in the rear of the equalizer bar, a doubletree free from the frame and disposed thereacross, a flexible means secured to the doubletree, the flexible means being disposed around the sheave and through the eye, and draft members for the leading draft animals, the flexible means being secured to the said draft members.

2. In a draft equalizer, a frame, means to secure the frame to a load to be drawn, a sheave mounted to rotate in the frame, the forward end of the frame having means for surrounding a portion of the flexible means, there being an opening in the said means by which the flexible means may be removed laterally, a tree free from the frame disposed thereacross, and a flexible means secured to the tree, the flexible means being disposed around the sheave and through the said means adapted for surrounding it for a distance.

In testimony whereof I have signed my name to this specification in the presence of two subscribing witnesses.

EZRA J. D. MILLER.

Witnesses:
A. E. SWANSON,
W. M. BARKER.